UNITED STATES PATENT OFFICE.

ALBERT KISSEL, OF FRANKFORT-ON-THE-MAIN, GERMANY, ASSIGNOR TO THE ADAMANTA MANUFACTURING COMPANY, OF BOSTON, MASS.

SUBSTITUTE FOR INDIA-RUBBER, CAOUTCHOUC, &c.

SPECIFICATION forming part of Letters Patent No. 350,459, dated October 5, 1886.

Application filed June 1, 1886. Serial No. 203,771. (No specimens.) Patented in France May 13, 1884, No. 162,098, and in England April 9, 1886, No. 4,918.

*To all whom it may concern:*

Be it known that I, ALBERT KISSEL, of Frankfort-on-the-Main, Germany, have invented an Improvement in Substitutes for India-Rubber, Caoutchouc, &c., of which the following is a specification.

This invention has for its object to produce a compound which may be used as a substitute for caoutchouc, gutta-percha, or other similar substances, or which may be used in combination with these substances.

In accordance with my invention I purpose to employ, as the elementary base or ingredient of my improved compound, resins derived from any source, and also the balsams of the coniferæ, after the said resins and balsams have been treated with caustic lime or other caustic alkaline earth to wholly or partially combine with the acids contained in the said resins and balsams, the combination of the caustic alkaline earth with the resinous acids imparting to the said resins and balsams a higher softening-point. The degree of hardness of the resins and balsams is in direct proportion to the amount of alkaline earthy salts formed in the said resins and balsams; but the amount of caustic alkaline earths employed should not be more than what is required to neutralize all the acids contained in the resins or balsams. The hardened resin or balsam produced as just described will, in accordance with my invention, be compounded with oil and sulphur, as will be hereinafter described, to produce a compound which may be applied to all the purposes for which caoutchouc and other like substances are employed.

In order that my invention may be easily comprehended, I will hereinafter set forth one method of producing my improved compound, and will enumerate the proportions of the ingredients used; but I wish it to be understood that I do not confine myself to the said proportions, as the same may be widely varied according to the quality of the substance desired and the use for which the compound is intended.

One mode by which I may produce my improved compound is to dissolve fifty pounds of hardened resin or balsam of the kind referred to in eighty pounds of oil, preferably linseed-oil, which has been previously boiled to destroy the albumen and chlorophyl in the oil and to render it tenacious. To this solution is added a second solution, made by dissolving eight pounds of sulphur in forty-two pounds of oil, preferably linseed. To the compound solution twenty pounds of sulphur are then added, and the mass heated to about 375° Fahrenheit. When the mass begins to solidify, the heat is removed and the mass allowed to cool.

The compound produced as described may be manipulated in the same manner as caoutchouc, gutta percha, and like substances are worked, and the said compound is applicable to the various uses for which caoutchouc, gutta-percha, and other like substances have been employed.

I do not desire to limit myself to the formula above given, as the same may be changed according to the use for which the compound is intended—as, for instance, all the sulphur may be dissolved in the oil at one operation, and the solution so formed added to the solution of resin and oil; but I prefer to employ the formula given, as the best results have been obtained with it.

In order to vary the consistency and increase the tenacity and durability of the compound, pulverulent or fibrous substances—such, for instance, as pulverized cork, asbestus, baryta, &c.—may be mixed with the ingredients.

My improved compound is adapted to be rolled or laid upon and incorporated with textile material for belting, packing, hose, rubber cloth, and other articles.

Among other uses to which my improved compound is especially applicable is that of waterproofing, the said compound being dissolved in any suitable solvent, such as spirits of turpentine, benzine, benzole, &c.

My improved compound resembles caoutchouc and possesses many of its properties, and the said compound may be used with caoutchouc as an extender, and when so used the product resulting from the mixture of caoutchouc and my improved compound possesses a higher melting or softening point than natural caoutchouc.

I claim—

1. As an improved article of manufacture, a substitute for caoutchouc, gutta-percha, &c., consisting of hardened resin and balsams of the class referred to and oil and sulphur, compounded together substantially as described.

2. The art or method of combining hardened resin and balsams of the class referred to with oil and sulphur, whereby a substitute for caoutchouc, gutta-percha, and similar substances is formed, substantially as described.

3. The art or method of manufacturing a substitute for caoutchouc, gutta-percha, and similar substances, which consists in dissolving in oil hardened resins and balsams of the class referred to; second, adding to the solution so formed a second solution composed of sulphur and oil, and, lastly, heating the mixed solutions, as and for the purpose set forth.

4. The art or method of manufacturing a substitute for caoutchouc, gutta-percha, and similar substances, which consists in dissolving in oil hardened resins and balsams of the class referred to; second, adding to the solution so formed a second solution composed of sulphur and oil; third, adding sulphur to the mixed solutions, and, lastly, heating the entire mass, as and for the purpose set forth.

5. The art or method of manufacturing a substitute for caoutchouc, gutta-percha, and similar substances, which consists in hardening resins and balsams of the class referred to by means of caustic lime or other caustic alkaline earth; second, dissolving the said hardened resin or balsam in oil; third, adding to the solution so formed a second solution composed of sulphur and oil, and thereafter heating the combined solutions, substantially as described.

6. The art or method of manufacturing a substitute for caoutchouc, gutta-percha, and similar substances, which consists in hardening resins and balsams of the class referred to by means of caustic lime or other caustic alkaline earth; second, dissolving the said hardened resin or balsam in oil; third, adding to the solution so formed a second solution composed of sulphur and oil; fourth, adding sulphur to the mixed solutions, and, lastly, heating the entire mass, as and for the purpose set forth.

In testimony whereof I have signed my name to this specification in the presence of two subscribing witnesses.

ALBERT KISSEL.

Witnesses:
GEO. W. GREGORY,
C. M. CONE.